United States Patent
Leibov et al.

(10) Patent No.: US 11,358,699 B2
(45) Date of Patent: Jun. 14, 2022

(54) AIRCRAFT PRESSURE DECK

(71) Applicant: The Boeing Company, Chicago, IL (US)

(72) Inventors: David H. Leibov, Seattle, WA (US); Steven D. Ingham, Everett, WA (US); Daniel Cox, Seattle, WA (US); Mark R. McLaughlin, Snohomish, WA (US); Alfons Menanno, Edmonds, WA (US); Soma Gopala Rao Paravata, Bellevue, WA (US); Kevin L. Sullivan, Camano Island, WA (US)

(73) Assignee: The Boeing Company, Chicago, IL (US)

( * ) Notice: Subject to any disclaimer, the term of this patent is extended or adjusted under 35 U.S.C. 154(b) by 178 days.

(21) Appl. No.: 16/841,947

(22) Filed: Apr. 7, 2020

(65) Prior Publication Data

US 2021/0309340 A1 Oct. 7, 2021

(51) Int. Cl.
*B64C 1/00* (2006.01)
*B64C 1/06* (2006.01)
*B64C 1/26* (2006.01)

(52) U.S. Cl.
CPC ............ *B64C 1/00* (2013.01); *B64C 1/061* (2013.01); *B64C 1/26* (2013.01)

(58) Field of Classification Search
CPC .. B64C 1/26; B64C 1/18; B64C 1/061; B64C 1/20; B64C 1/064
See application file for complete search history.

(56) References Cited

U.S. PATENT DOCUMENTS

| 2,412,778 | A | | 12/1946 | Kosek | |
|---|---|---|---|---|---|
| 5,383,630 | A | | 1/1995 | Flatten | |
| 8,523,109 | B2 | * | 9/2013 | Demont | B64C 1/18 244/118.1 |
| 9,284,130 | B1 | * | 3/2016 | Himmelmann | B64C 1/20 |

(Continued)

FOREIGN PATENT DOCUMENTS

| CN | 105318148 A | | 2/2016 | |
|---|---|---|---|---|
| EP | 2962936 A1 | * | 1/2016 | B64D 11/0696 |

OTHER PUBLICATIONS

European Search Report; Application EP21152907; dated Jun. 29, 2021.

*Primary Examiner* — Joshua J Michener
*Assistant Examiner* — Ryan Andrew Yankey
(74) *Attorney, Agent, or Firm* — Duft & Bornsen, PC

(57) ABSTRACT

Embodiments for aircraft pressure deck. One embodiment is a pressure deck of an aircraft. The pressure deck includes beams extending longitudinally along a fuselage of the aircraft, and a web attached to an underside of the beams, the web including arches between adjacent beams to allow the pressure deck to flex laterally. The pressure deck also includes a box structure between a middle pair of the beams and configured to transfer load forward to a rear spar of a wing of the aircraft and aft to an aft wheel well bulkhead of the aircraft. The pressure deck further includes a first intercostal outboard from the box structure and configured to stabilize a first outboard pair of the beams, and a second intercostal outboard from the first intercostal and coupled between a second outboard pair of the beams via a swing link to allow the second intercostal to flex laterally.

20 Claims, 5 Drawing Sheets

(56) References Cited

U.S. PATENT DOCUMENTS

| | | | |
|---|---|---|---|
| 9,896,185 B2* | 2/2018 | Cullen | B64C 1/20 |
| 11,235,850 B2* | 2/2022 | McLaughlin | B64C 1/06 |
| 2006/0231681 A1* | 10/2006 | Huber | B64C 1/064 |
| | | | 244/119 |
| 2009/0283637 A1 | 11/2009 | Nolla | |
| 2010/0170987 A1* | 7/2010 | Meyer | B64C 1/26 |
| | | | 244/120 |
| 2010/0213315 A1 | 8/2010 | Marpinard | |
| 2010/0282903 A1 | 11/2010 | Gauthie et al. | |
| 2021/0171182 A1* | 6/2021 | McLaughlin | B64C 1/065 |
| 2021/0179249 A1* | 6/2021 | McLaughlin | B64C 1/00 |

* cited by examiner

AIRCRAFT PRESSURE DECK

FIELD

This disclosure relates to the field of aircraft and, in particular, to a pressure deck of an aircraft.

BACKGROUND

Large aircraft have a pressure deck in the fuselage located near where the wings attach to the fuselage. The pressure deck separates the pressurized cabin from the unpressurized main wheel well, and transfers the weight of cargo and/or passengers to the main structures of the fuselage and wings. A pressure deck for a freighter variant of an aircraft is typically different than that of a passenger aircraft due to the additional support and load paths required for a freighter floor. However, providing additional structural support may impede the structural flexibility of the pressure deck, and it is advantageous to maintain structural flexibility to enable the aircraft to carry heavy loads with relatively lighter material.

SUMMARY

Embodiments described herein provide an aircraft pressure deck. The pressure deck separates the pressurized cabin from the unpressurized main wheel well and allows flexing between the wing and fuselage. Additionally, the pressure deck can be used in both a passenger version and a freighter version of an aircraft, saving manufacturing cost through common tooling.

One embodiment is a pressure deck of an aircraft. The pressure deck includes beams extending longitudinally along a fuselage of the aircraft, and a web attached to an underside of the beams, the web including arches between adjacent beams to allow the pressure deck to flex laterally. The pressure deck also includes a box structure between a middle pair of the beams and configured to transfer load forward to a rear spar of a wing of the aircraft and aft to an aft wheel well bulkhead of the aircraft. The pressure deck further includes a first intercostal outboard from the box structure and configured to stabilize a first outboard pair of the beams, and a second intercostal outboard from the first intercostal and coupled between a second outboard pair of the beams via a swing link to allow the second intercostal to flex laterally.

Another embodiment is an aircraft that includes a fuselage, and a pressure deck. The pressure deck includes beams extending longitudinally along the fuselage, and a web attached to an underside of the beams, the web including arches between adjacent beams to allow the pressure deck to flex laterally. The pressure deck also includes a box structure between a middle pair of the beams and configured to transfer load forward to a rear spar of a wing of the aircraft and aft to an aft wheel well bulkhead of the aircraft. The pressure deck further includes a first intercostal outboard from the box structure and configured to stabilize a first outboard pair of the beams, and a second intercostal outboard from the first intercostal and coupled between a second outboard pair of the beams via a swing link to allow the second intercostal to flex laterally.

Yet another embodiment is pressure deck of an aircraft. The pressure deck includes beams extending longitudinally in the aircraft between a rear spar and an aft wheel well bulkhead of the aircraft, and a web attached to an underside of the beams, the web including arches between adjacent beams to allow the pressure deck to flex laterally. The pressure deck also includes a fuselage frame coupling an outermost beam of the pressure deck with a wing of the aircraft, an outboard intercostal coupling the outermost beam with an outboard beam disposed inboard from the outermost beam, and an inboard intercostal coupling the outboard beam and an inboard beam disposed inboard from the outboard beam. The pressure deck further includes a box structure coupled between a pair of innermost beams. The outboard intercostal couples with the outermost beam via a pin, and couples with the outboard beam via a swing link.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments are now described, by way of example only, and with reference to the accompanying drawings. The same reference number represents the same element or the same type of element on all drawings.

DETAILED DESCRIPTION

The figures and the following description illustrate specific example embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure are to be construed as being without limitation. As a result, this disclosure is not limited to the specific embodiments or examples described below, but by the claims and their equivalents.

Figure 1:
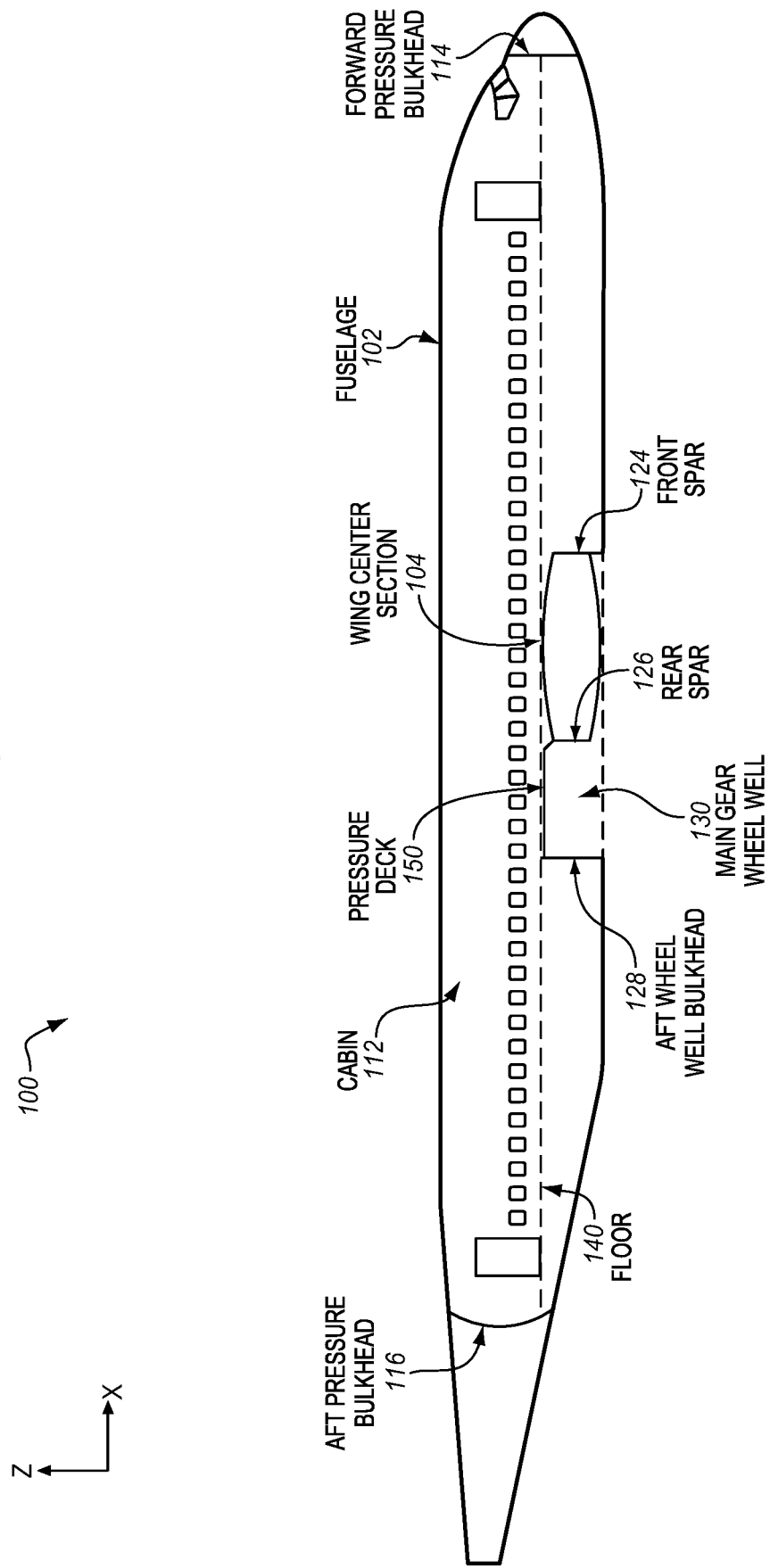
FIG. 1 is a side view of an aircraft.

FIG. 1 is a side view of an aircraft 100. The aircraft includes a fuselage 102 and wings coupled thereto at a wing center section 104 that includes a front spar 124 and rear spar 126. The fuselage 102 includes a cabin 112 that maintains a pressurized environment for altitudes and which is sealed by bulkheads including a forward pressure bulkhead 114 and an aft pressure bulkhead 116.

The aircraft 100 also includes a pressure deck 150 disposed between the cabin 112 and the main gear wheel well 130 (e.g., in a vertical Z-direction). The pressure deck 150 extends longitudinally (e.g., in the X-direction) between the rear spar 126 and an aft wheel well bulkhead 128 of the aircraft 100. The pressure deck 150 forms a portion of a floor 140 of the cabin 112 to seal the cabin 112 and support aircraft loads including passengers and/or cargo. Additionally, the pressure deck 150 includes structure that defines the fuselage/wing interaction. Generally, structural flexibility within the pressure deck 150 allows it to flex with the wings and react to loads with relatively lighter materials.

While flexibility of the pressure deck 150 is suitable for passenger aircraft, freighter aircraft designs call for more structural rigidity/strength in the floor 140 to stabilize cargo (e.g., containers, pallets, etc.). Unfortunately, existing techniques for strengthening the pressure deck 150 for cargo tend to counteract its structural flexibility and associated benefits. Moreover, existing techniques call for a different structural design of the pressure deck 150 between a passenger version and freighter version of an aircraft, increasing aircraft manufacturing costs.

Figure 2:
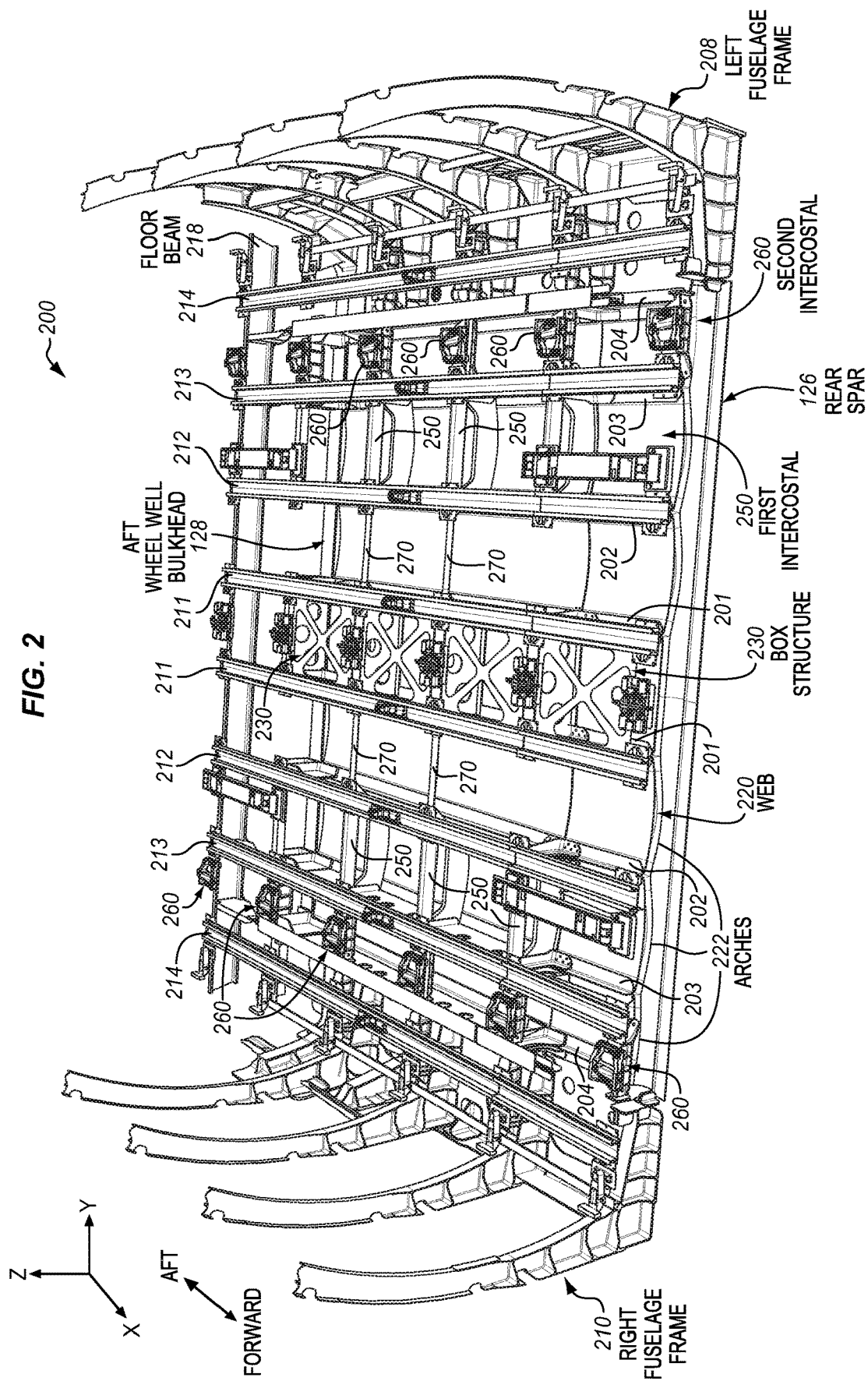
FIG. 2 is a perspective view of a pressure deck in an illustrative embodiment.

FIG. 2 is a perspective view of a pressure deck 200 in an illustrative embodiment. The pressure deck 200 includes structure configured to allow lateral flexibility in the pressure deck 200 while providing a strengthened cargo carrying capability. The pressure deck 200 may thus advantageously be used in both a passenger version and a cargo version of an aircraft, saving significant aircraft manufacturing expense. Though sometimes described with respect to the aircraft 100 of FIG. 1, the pressure deck 200 may be installed in alternative aircraft. As shown in FIG. 1, structural components of the pressure deck 200 may be mirrored at left/right sides and thus may be shown/described herein with respect to both sides (using the same element numbers at both locations) or shown/described with respect to a single location to represent one of the two sides.

The pressure deck 200 includes beams 201-204 extending longitudinally along a fuselage 102 of the aircraft 100 (e.g., an X-direction or along a fuselage of the aircraft). The beams 201-204 generally extend between the rear spar 126 and the aft wheel well bulkhead 128 of the aircraft 100. Additionally, the beams 201-204 are spaced from one another in a lateral direction (e.g., Y-direction). In one embodiment, four beams 201-204 are disposed between a lateral center of the aircraft 100 (or fuselage 102) and the left fuselage frame 208, and four beams 201-204 are disposed between the lateral center and the right fuselage frame 210.

The pressure deck 200 further includes a web 220 attached to an underside of the beams 201-204. The web 220 includes arches 222 between adjacent beams 201-204 to allow the pressure deck 200 to flex laterally. In addition to providing flexibility and compressibility to the pressure deck 200, the arches 222 in the web 220 are configured to support pressure from the cabin 112 that is disposed above the pressure deck 200. Generally, the web 220 may form a sheet structure with individual arches 222 having a curved structure between two adjacent beams.

The pressure deck 200 also includes one or more box structure(s) 230 between a middle pair of the beams (e.g., beams 201). The box structure(s) 230 may be disposed along a longitudinal center of the fuselage 102 or pressure deck 200 (e.g., aligned in the X-direction). Generally, the box structure 230 is configured to transfer vertical and lateral load forward to the rear spar 126 and aft to the aft wheel well bulkhead 128 of the aircraft 100. Additional structural detail of the box structure 230 is described below.

The pressure deck 200 further includes one or more first intercostal(s) 250 outboard from the box structure 230, and one or more second intercostal(s) 260 outboard from the first intercostal(s) 250. Generally speaking, an intercostal is a structural member coupling between two adjacent beams. The first intercostal(s) 250 are coupled between a first outboard pair of the beams 202-203 and configured to stabilize the beams 202-203. The second intercostal(s) 260 are coupled between a second outboard pair of the beams 203-204 and configured to transfer vertical loads to the beams 203-204, and lateral loads to the fuselage frames 208/210. As further described below, the second intercostal 260 is coupled to the second outboard pair of the beams 203-204 via a swing link to allow the second intercostal 260 and the pressure deck 200 to flex laterally.

The pressure deck 200 may further include one or more tension strap(s) 270 disposed between the box structure 230 and the first intercostal 250. In particular, the tensions strap(s) 270 may be coupled between one of the middle pair of the beams 201 and one of the first outboard pair of the beams 202. The tension strap 270 is configured to transfer lateral load (e.g., from a cargo restraint system) between the box structure 230 and the first intercostal 250. In particular, the tension strap 270 may provide additional lateral capability for a freighter floor but bend out of the way during maximum wing bending scenarios. Thus, the tension strap 270 is configured to support lateral forces between beams 201/202 via tension, and to bend in response to compression allowing the pressure deck 200 to flex with deflections from a wing of the aircraft.

The pressure deck 200 may support a cargo restraint system configured to load/support cargo for a freighter aircraft. For example, the pressure deck 200 may support tracks 211-214 disposed along the beams 201-204 to transport and restrain cargo in the aircraft 100. The tracks 211-214 may also be supported by one or more floor beam(s) 218 extending laterally (e.g., in the Y-direction) across the fuselage in regions away from the pressure deck 200. The arrangement of box structure(s) 230, first intercostal(s) 250, and second intercostal(s) 260 advantageously allow the pressure deck 200 to flex laterally while maintaining a vertical and lateral load path for the cargo restraint system, as further described below.

Figure 3:
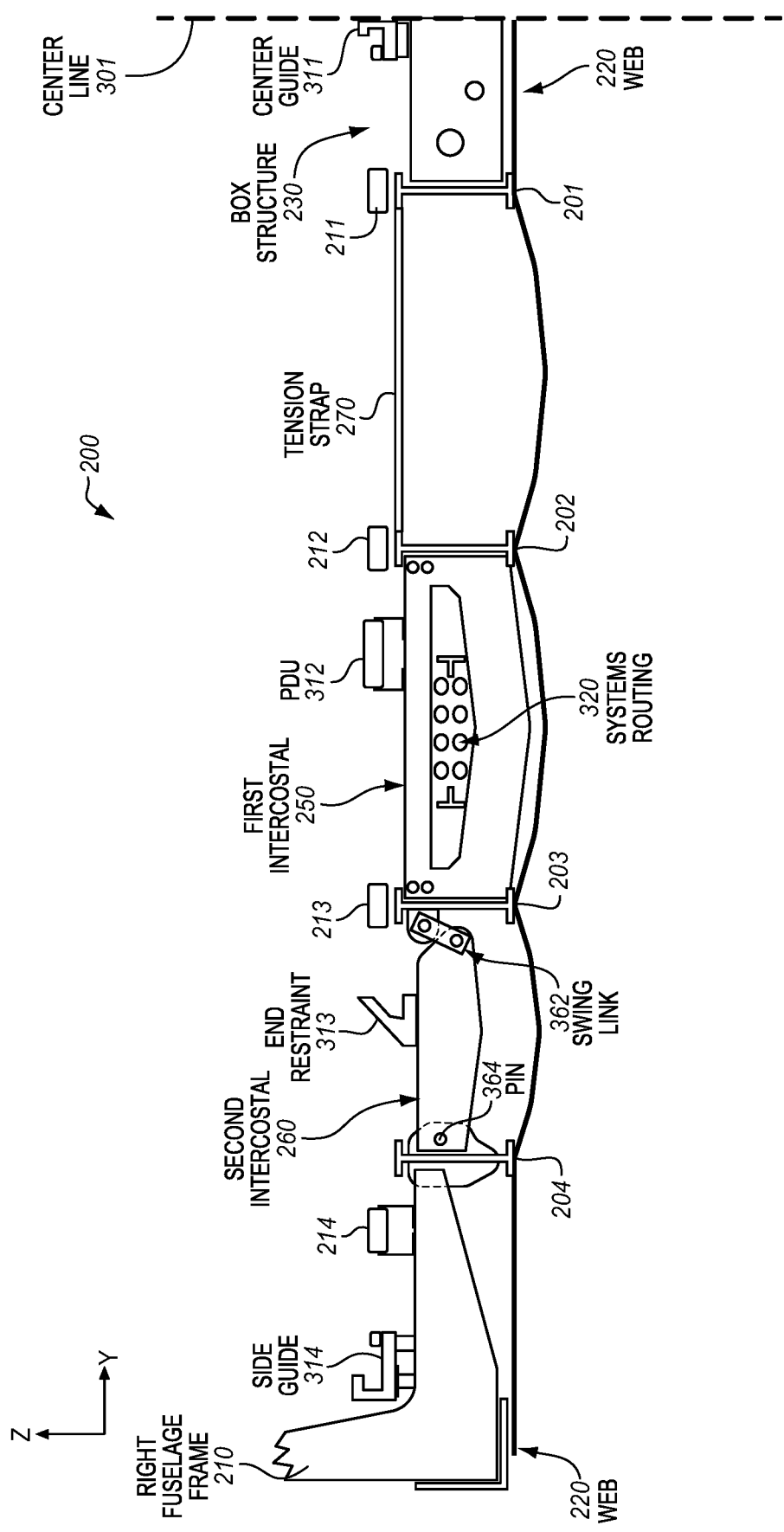
FIG. 3 is a front view of the pressure deck in an illustrative embodiment.

FIG. 3 is a front view of the pressure deck 200 in an illustrative embodiment. FIG. 3 shows a right half of the pressure deck 200 from a center line 301 to the right fuselage frame 210. In addition to tracks 211-214, the pressure deck 200 may include or support other components of a cargo restraint system such as a center guide 311, a power drive unit (PDU) 312, an end restraint 313, and a side guide 314. Additionally, FIG. 3 shows that, in a direction from outboard to inboard, the right fuselage frame 210 couples with an outermost beam (e.g., beam 204), the second intercostal 260 (e.g., outboard intercostal) couples the outermost beam with an outboard beam (e.g., beam 203), the first intercostal 250 (e.g., inboard intercostal) couples the outboard beam with an inboard beam (e.g., beam 202), the tension strap 270 couples the inboard beam with an innermost beam (e.g., beam 201), and the box structure 230 couples between a pair of innermost beams.

Furthermore, FIG. 3 shows that the second intercostal 260 may couple with the outboard beam (e.g., beam 203) via a swing link 362, and/or couple with the outermost beam (e.g., beam 204) via a pin 364. The swing link 362 and/or pin 364 may provide flexibility (e.g., in rotation in the Z-Y plane) to release moments as the pressure deck 200 deforms under loads from flight and pressure. For example, the swing link 362 may support/transmit a lateral load path for cargo reacted at the end restraint 313 to the right fuselage frame 210 while still allowing lateral flexibility (e.g., in the Y-direction) in the second intercostal 260 and thus the pressure deck 200. The second intercostal 260 may also transmit vertical loads from the end restraint 313 to the outermost beam (e.g., beam 204) via the pin 364 and to the outboard beam (e.g., beam 203) via the swing link 362.

Thus, in some embodiments, the second intercostal 260 includes structure that attaches to the outermost/outboard beams (e.g., beams 203-204) and supports/transfers vertical load to the beams and/or right fuselage frame 210 with a prescribed lateral give via the swing link 362 at beam 203 and lateral support at pin 364. In further embodiments, the first intercostal 250 includes a rigid structure that stabilizes the outboard/inboard beams (e.g., beams 202-203) and supports/transfers vertical load to the beams with a fixed lateral structure. Additionally, the first intercostal 250 may also enable systems routing 320 (e.g., cables) over the pressure deck 200, as described in greater detail below.

Figure 4:
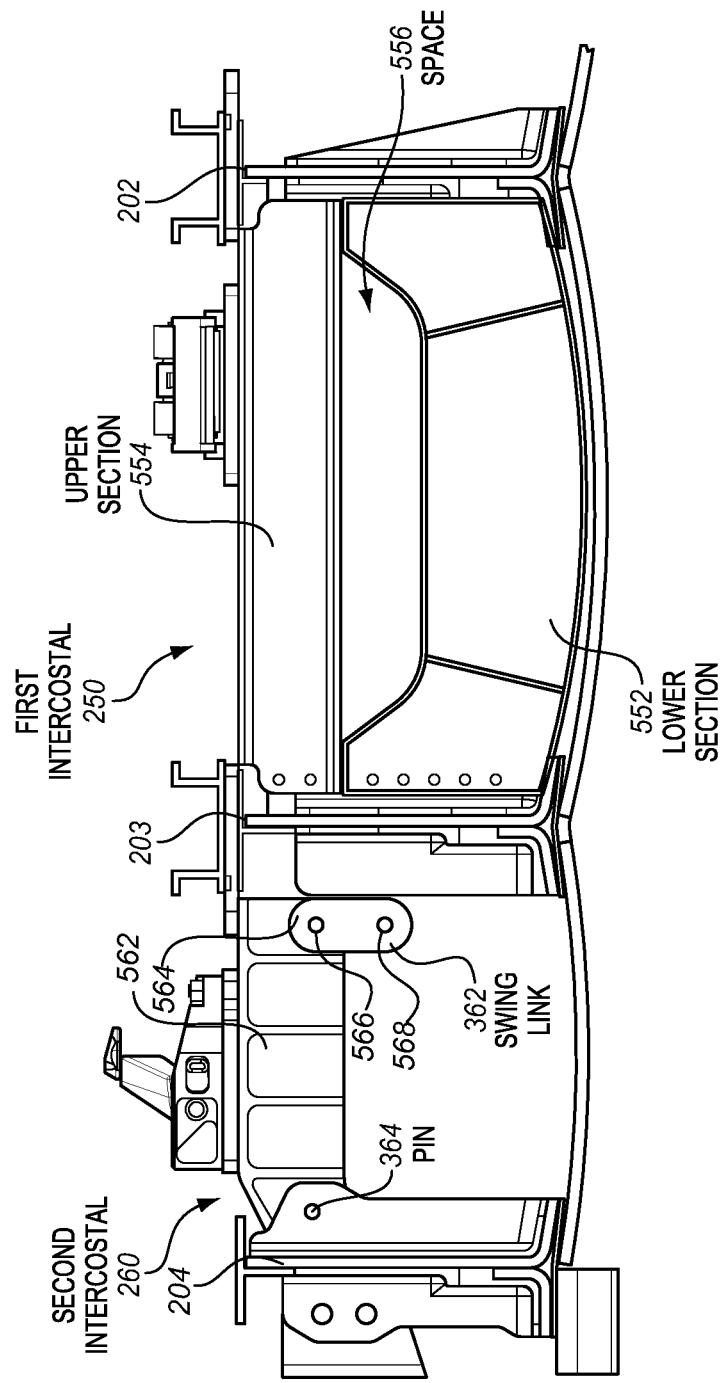
FIG. 4 is a front view of the first intercostal and second intercostal in an illustrative embodiment.

FIG. 4 is a front view of the first intercostal 250 and second intercostal 260 in an illustrative embodiment. The first intercostal 250 includes a lower section 552 to fixedly couple between a first outboard pair of the beams (e.g., beams 202-203), and also includes an upper section (554) to fixedly couple between the first outboard pair of beams (e.g., beams 202-203) separately from the lower section 552. Additionally, the first intercostal 250 includes a space 556 between the lower section 552 and the upper section 554 configured to accommodate aircraft systems routing (e.g., systems routing 320, not shown in FIG. 4). In some embodiments, the lower section 552 is to be installed at a first installation, the upper section 554 to be installed at a second installation, and the space 556 therebetween is for installing aircraft system routings at a time between the first installation and the second installation. The first intercostal 250 thus enables the pressure deck 200 to accommodate routing specifications for aircraft such as freighter aircraft.

The second intercostal 260 includes a first structural member 562 that extends between beams 203-204. In particular, the first structural member 562 couples with beam 203 via the swing link 362 and with beam 204 via the pin 364. The swing link 362 includes a second structural member 564 that couples between the first structural member 562 and the beam 203. The second structural member 564 may include pinned connections 566-568 that allow for lateral flexibility in the second intercostal 260. Pinned connection 568 may attach directly or indirectly to the beam 203.

Figure 5:
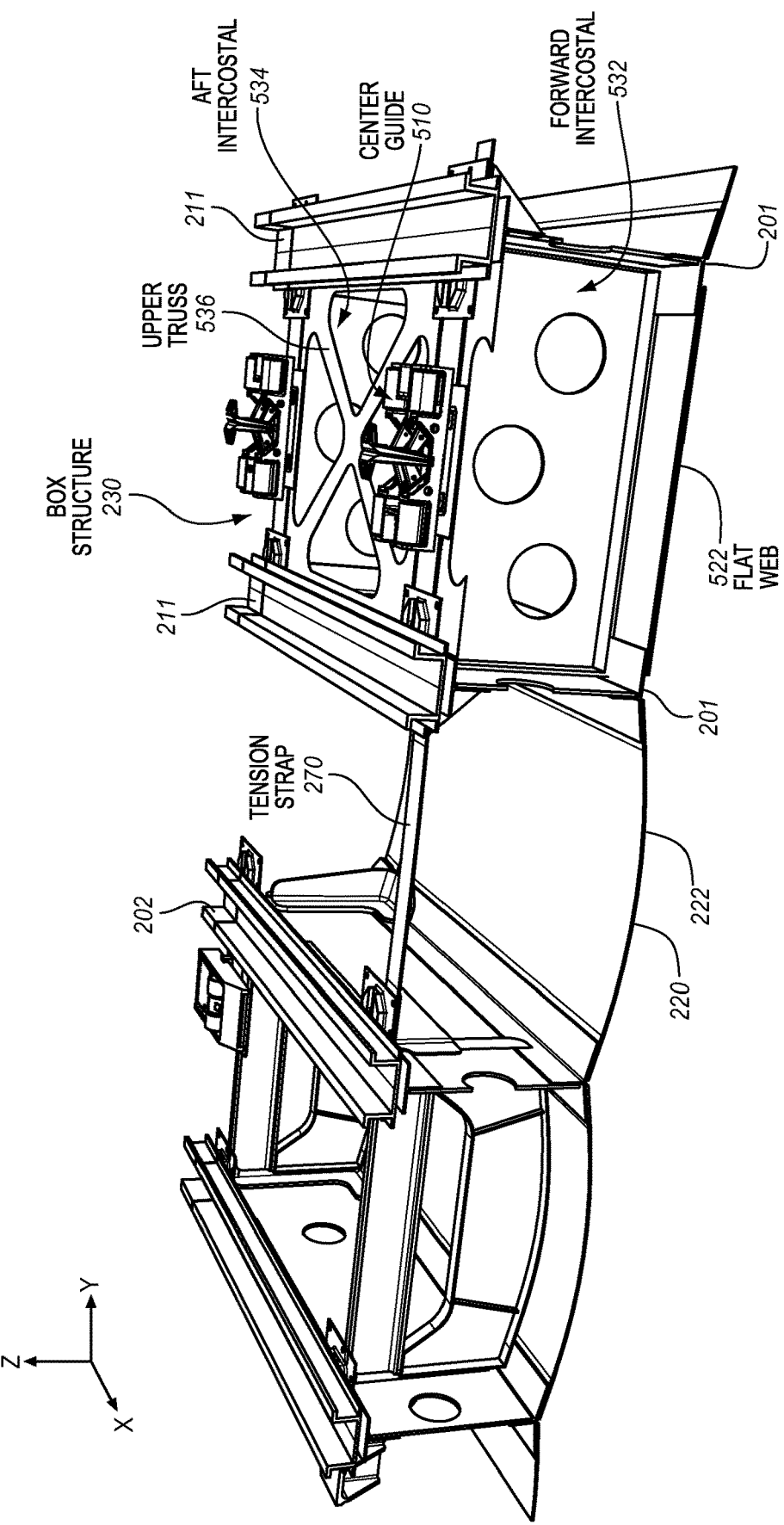
FIG. 5 a perspective view of the box structure in an illustrative embodiment.

FIG. 5 is a perspective view of the box structure 230 in an illustrative embodiment. The box structure 230 is configured to react loads on the beams (e.g., beams 201) from cargo positioned on the tracks 211 and center guide 510. In particular, the box structure 230 includes a forward intercostal 532 coupling the middle pair of the beams (e.g., beams 201), an aft intercostal 534 coupling the middle pair of the beams (e.g., at a position aft of the forward intercostal 532), and an upper truss 536 coupling the forward intercostal 532 and the aft intercostal 534. In some embodiments, the web 220 is flat underneath the box structure 230, or includes a flat web portion 522, to accommodate system routings. Alternatively or additionally, the web 220 may include an arch 222 between adjacent ones of the beams 201-204 as described above.

Although specific embodiments were described herein, the scope is not limited to those specific embodiments. Rather, the scope is defined by the following claims and any equivalents thereof.

What is claimed is:

1. A pressure deck of an aircraft, the pressure deck comprising:
   beams extending longitudinally along a fuselage of the aircraft and spaced from one another in a lateral direction, wherein the beams include a middle pair of beams, and outboard beams spaced in the lateral direction from the middle pair of beams on each side of the pressure deck;
   a web attached to an underside of the beams, the web including arches between adjacent beams to allow the pressure deck to flex laterally;
   a box structure between the middle pair of the beams, and configured to transfer a load forward to a rear spar of a wing of the aircraft and aft to an aft wheel well bulkhead of the aircraft;
   each side of the pressure deck comprising:
      a tension strap coupled between one of the middle pair of the beams and a first one of the outboard beams in the lateral direction, wherein the tension strap is configured to support lateral forces between the one of the middle pair of beams and the first one of the outboard beams via tension, and to bend in response to compression;
      a first intercostal coupled between the first one of the outboard beams and a second one of the outboard beams in the lateral direction, and configured to stabilize the first one of the outboard beams and the second one of the outboard beams with a fixed lateral structure; and
      a second intercostal coupled between the second one of the outboard beams and a third one of the outboard beams in the lateral direction, and configured to flex laterally;
      wherein the third one of the outboard beams couples with a fuselage frame;
      wherein the second intercostal is configured to transfer a vertical load to the second one of the outboard beams and the third one of the outboard beams, and to transfer a lateral load to the fuselage frame.

2. The pressure deck of claim 1 wherein:
the second intercostal is coupled to the second one of the outboard beams via a swing link to flex laterally;
the swing link comprises a structural member having a first pinned connection with the second intercostal and a second pinned connection with the second one of the outboard beams; and
the second intercostal is coupled to the third one of the outboard beams via a pin.

3. The pressure deck of claim 1 wherein:
the first intercostal includes a lower section to fixedly couple between the first one of the outboard beams and the second one of the outboard beams, and an upper section to fixedly couple between the first one of the outboard beams and the second one of the outboard beams separately from the lower section, and
a space between the lower section and the upper section of the first intercostal is configured to accommodate aircraft systems routing.

4. The pressure deck of claim 2 wherein:
the second pinned connection of the swing link attaches directly to the second one of the outboard beams.

5. The pressure deck of claim 2 wherein:
the second pinned connection of the swing link attaches indirectly to the second one of the outboard beams.

6. The pressure deck of claim 1 wherein:
the web is flat underneath the box structure.

7. The pressure deck of claim 1 wherein:
the box structure includes a forward intercostal coupling the middle pair of the beams, an aft intercostal coupling the middle pair of the beams, and an upper truss coupling the forward intercostal and the aft intercostal.

8. The pressure deck of claim 1 wherein:
the pressure deck is vertically disposed between a cabin and a main wheel well of the aircraft.

9. The pressure deck of claim 8 wherein:
the arches of the web are configured to support pressure from the cabin that is disposed above the pressure deck.

10. An aircraft comprising:
a fuselage; and
a pressure deck comprising:
  beams extending longitudinally along the fuselage and spaced from one another in a lateral direction, wherein the beams include a middle pair of beams, and outboard beams spaced in the lateral direction from the middle pair of beams on each side of the pressure deck;
  a web attached to an underside of the beams, the web including arches between adjacent beams to allow the pressure deck to flex laterally;
  a box structure between the middle pair of the beams, and configured to transfer a load forward to a rear spar of a wing of the aircraft and aft to an aft wheel well bulkhead of the aircraft;
  each side of the pressure deck comprising:
    a tension strap coupled between one of the middle pair of the beams and a first one of the outboard beams in the lateral direction, wherein the tension strap is configured to support lateral forces between the one of the middle pair of beams and the first one of the outboard beams via tension, and to bend in response to compression;
    a first intercostal coupled between the first one of the outboard beams and a second one of the outboard beams in the lateral direction, and configured to stabilize the first one of the outboard beams and the second one of the outboard beams with a fixed lateral structure; and
    a second intercostal coupled between the second one of the outboard beams and a third one of the outboard beams in the lateral direction, and configured to flex laterally;
    wherein the third one of the outboard beams couples with a fuselage frame of the fuselage;
    wherein the second intercostal is configured to transfer a vertical load to the second one of the outboard beams and the third one of the outboard beams, and to transfer a lateral load to the fuselage frame.

11. The aircraft of claim 10 wherein:
the second intercostal is coupled to the second one of the outboard beams via a swing link to flex laterally;
the swing link comprises a structural member having a first pinned connection with the second intercostal and a second pinned connection with the second one of the outboard beams; and
the second intercostal is coupled to the third one of the outboard beams via a pin.

12. The aircraft of claim 10 wherein:
the first intercostal includes a lower section to fixedly couple between the first one of the outboard beams and the second one of the outboard beams, and an upper section to fixedly couple between the first one of the outboard beams and the second one of the outboard beams separately from the lower section, and
a space between the lower section and the upper section of the first intercostal is configured to accommodate aircraft systems routing.

13. The aircraft of claim 10 wherein:
the web is flat underneath the box structure.

14. The aircraft of claim 10 wherein:
the pressure deck is vertically disposed between a cabin and a main wheel well of the aircraft, and the arches of the web are configured to support pressure from the cabin that is disposed above the pressure deck.

15. A pressure deck of an aircraft, the pressure deck comprising:
  beams extending longitudinally in the aircraft between a rear spar and an aft wheel well bulkhead of the aircraft, and spaced from one another in a lateral direction, wherein the beams include a middle pair of beams, and outboard beams spaced in the lateral direction from the middle pair of beams on a side of the pressure deck;
  a web attached to an underside of the beams, the web including arches between adjacent beams to allow the pressure deck to flex laterally;
  a box structure between the middle pair of the beams, and configured to transfer a load forward to the rear spar and aft to the aft wheel well bulkhead;
  a tension strap coupled between one of the middle pair of the beams and a first one of the outboard beams in the lateral direction, wherein the tension strap is configured to support lateral forces between the one of the middle pair of beams and the first one of the outboard beams via tension, and to bend in response to compression;
  a first intercostal coupled between the first one of the outboard beams and a second one of the outboard beams in the lateral direction, and configured to stabilize the first one of the outboard beams and the second one of the outboard beams with a fixed lateral structure;
  a second intercostal coupled between the second one of the outboard beams and a third one of the outboard beams in the lateral direction;
  wherein the second intercostal is coupled to the second one of the outboard beams via a swing link to flex laterally;
  wherein the swing link comprises a structural member having a first pinned connection with the second intercostal and a second pinned connection with the second one of the outboard beams; and
  wherein the second intercostal is coupled to the third one of the outboard beams via a pin.

16. The pressure deck of claim 15 wherein
the first intercostal includes a lower section to fixedly couple between the first one of the outboard beams and the second one of the outboard beams, and an upper section to fixedly couple between the first one of the outboard beams and the second one of the outboard beams separately from the lower section, and
a space between the lower section and the upper section of the first intercostal is configured to accommodate aircraft systems routing.

17. The pressure deck of claim 15 wherein:
the box structure includes a forward intercostal coupling the middle pair of the beams, an aft intercostal coupling the middle pair of the beams, and an upper truss coupling the forward intercostal and the aft intercostal.

18. The pressure deck of claim 15 wherein:
a portion of the web that is underneath the box structure is flat.

19. The pressure deck of claim 15 wherein:
the box structure is configured to support a middle longitudinal section of the pressure deck.

20. The pressure deck of claim 15 wherein:
the pressure deck further includes tracks disposed on top of one or more of the beams to support and translate cargo longitudinally in the aircraft.

* * * * *